(12) United States Patent
Kim et al.

(10) Patent No.: US 12,069,238 B2
(45) Date of Patent: Aug. 20, 2024

(54) IMAGE COMPRESSION METHOD AND APPARATUS FOR MACHINE VISION

(71) Applicant: ELECTRONICS AND TELECOMMUNICATIONS RESEARCH INSTITUTE, Daejeon (KR)

(72) Inventors: Joon-Soo Kim, Daejeon (KR); Joung-Il Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 71 days.

(21) Appl. No.: 18/084,188

(22) Filed: Dec. 19, 2022

(65) Prior Publication Data

US 2023/0336710 A1   Oct. 19, 2023

(30) Foreign Application Priority Data

Apr. 18, 2022   (KR) .................. 10-2022-0047507

(51) Int. Cl.
| | |
|---|---|
| *H04N 19/103* | (2014.01) |
| *G06T 9/00* | (2006.01) |
| *G06V 10/44* | (2022.01) |
| *G06V 10/74* | (2022.01) |
| *G06V 10/764* | (2022.01) |
| *G06V 10/771* | (2022.01) |
| *H04N 19/513* | (2014.01) |

(52) U.S. Cl.
CPC ............. *H04N 19/103* (2014.11); *G06T 9/00* (2013.01); *G06V 10/44* (2022.01); *G06V 10/761* (2022.01); *G06V 10/764* (2022.01); *G06V 10/771* (2022.01); *H04N 19/513* (2014.11)

(58) Field of Classification Search
CPC .... H04N 19/103; H04N 19/513; H04N 19/11; H04N 19/147; H04N 19/172; H04N 19/60; G06T 9/00; G06T 9/002; G06T 2207/20084; G06V 10/44; G06V 10/761; G06V 10/764; G06V 10/771; G06N 3/084
See application file for complete search history.

(56) References Cited

U.S. PATENT DOCUMENTS

| | | |
|---|---|---|
| 11,216,178 B2 | 1/2022 | Choi et al. |
| 11,935,296 B2 * | 3/2024 | Moon .................... G06V 20/44 |
| 2020/0175353 A1 | 6/2020 | Kim et al. |
| (Continued) | | |

FOREIGN PATENT DOCUMENTS

| | | |
|---|---|---|
| KR | 10-2017-0094745 | 8/2017 |
| KR | 10-2245682 | 4/2021 |

*Primary Examiner* — Joseph Suh
(74) *Attorney, Agent, or Firm* — KILE PARK REED & HOUTTEMAN PLLC

(57) ABSTRACT

Disclosed herein are an image compression method and apparatus for machine vision. The image compression method includes determining a prediction mode for frames of an input image, generating a prediction frame and a residual image using an input frame, generating a reconstructed frame by adding the prediction frame to the residual image, extracting respective features of the input frame and the reconstructed frame, correcting the reconstructed frame based on a difference value between the extracted features and a bit rate of the residual image, and encoding the corrected frame.

16 Claims, 7 Drawing Sheets

(56) References Cited

U.S. PATENT DOCUMENTS

2021/0120355 A1    4/2021  Kim et al.
2021/0211684 A1*  7/2021  Andreopoulos ....... G06N 3/088
2022/0159269 A1*  5/2022  Goswami ............. H04N 19/186

* cited by examiner

IMAGE COMPRESSION METHOD AND APPARATUS FOR MACHINE VISION

CROSS REFERENCE TO RELATED APPLICATION

This application claims the benefit of Korean Patent Application No. 10-2022-0047507, filed Apr. 18, 2022, which is hereby incorporated by reference in its entirety into this application.

BACKGROUND OF THE INVENTION

1. Technical Field

The present invention relates generally to an image deformation and compression method for performing a machine vision task.

In detail, the present invention relates to a method for maximally maintaining the performance of execution of a machine vision task based on a reconstructed image instead of maximally maintaining the cognitive image quality of the reconstructed image.

2. Description of the Related Art

It may be considered that video coding technology has been developed in a form in which original data is compressed into a much smaller bitstream while minimizing the deterioration of cognitive image quality through the removal of data redundancy, the deletion of less important information, etc. Because the purpose of this technology is to display an image, the quality of which is most similar to that of original data, to a user, the only design condition is that that a decoded image must be sufficiently similar to the original image.

However, when a subject that consumes an image is a machine having a specific purpose, rather than a human being, another condition may be required. In detail, even if a decoded image is not similar to an original image, when the decoded image contains pieces of information required for a task desired to be performed by the corresponding machine, the decoded image may be sufficiently used to perform the corresponding task. Because the amount of information that can be extracted from an image is smaller than that of a source image from which the corresponding information is obtained, the machine needs a smaller amount of information than that required for reconstructing the image without loss.

A standard for Video Coding for Machine (VCM) being discussed by MPEG includes the above-described idea, and thus technology for training an end-to-end image compression network in further consideration of machine vision performance, technology for extracting and compressing feature maps essential for a machine vision task, etc. are under discussion. Although such end-to-end image compression technologies exhibit performance beyond existing video codec-based compression, an image compression technique is not yet extended to videos, and intermediate feature map compression requires improvement of additional compressibility due to ineffective redundancy removal and high data redundancy.

The present invention proposes an algorithm which induces information less important to performance of a machine vision task to be discarded while easily extending image compression technology to videos by utilizing the existing video codec without change.

PRIOR ART DOCUMENTS

Patent Documents (Patent Document 1) Korean Patent Application Publication No. 10-2245682 (Title: Apparatus for Compressing Image, Learning Apparatus and Method thereof)

SUMMARY OF THE INVENTION

Accordingly, the present invention has been made keeping in mind the above problems occurring in the prior art, and an object of the present invention is to find an image that can be maximally compressed through a given image encoder, among images from which the same feature map is extracted.

Another object of the present invention is to provide a structure that induces consecutive frames to be deformed in a similar manner so as to prevent compression efficiency from being decreased.

In accordance with an aspect of the present invention to accomplish the above objects, there is provided an image compression method for machine vision, including determining a prediction mode for frames of an input image; generating a prediction frame and a residual image using an input frame; generating a reconstructed frame by adding the prediction frame to the residual image; extracting respective features of the input frame and the reconstructed frame; correcting the reconstructed frame based on a difference value between the extracted features and a bit rate of the residual image; and encoding the corrected frame.

Determining the prediction mode may include classifying the first frame based on a similarity between feature maps of the first frame and a second frame, set to an I-frame prior to the first frame.

Classifying the first frame may include, when the similarity between the feature maps of the first frame and the second frame is greater than a preset value, classifying the first frame as a P-frame, whereas when the similarity between the feature maps is less than or equal to the preset value, classifying the first frame as an I-frame.

Generating the prediction frame and the residual image using the input frame may include, when the input frame corresponds to an I-frame, generating a distorted frame in which the input frame is encoded and decoded.

Generating the reconstructed frame may include transforming and inversely transforming the residual image into a bitstream.

Generating the prediction frame and the residual image using the input frame may be iteratively performed using the reconstructed frame as input.

Generating the prediction frame and the residual image using the input frame may include, when the input frame corresponds to a P-frame, estimating a motion vector with reference to an original I-frame; and generating a motion-compensated frame using the motion vector and a reconstructed I-frame.

Correcting the reconstructed frame may include updating a transform coefficient for the residual image based on the difference value between the extracted features and the bit rate of the residual image.

In accordance with another aspect of the present invention to accomplish the above objects, there is provided an image compression apparatus for machine vision, including memory configured to store at least one program; and a processor configured to execute the program, wherein the program includes instructions for performing determining a prediction mode for frames of an input image; generating a prediction frame and a residual image using an input frame; generating a reconstructed frame by adding the prediction frame to the residual image; extracting respective features of the input frame and the reconstructed frame; correcting the reconstructed frame based on a difference value between the extracted features and a bit rate of the residual image; and encoding the corrected frame.

Determining the prediction mode may include classifying the first frame based on a similarity between feature maps of the first frame and a second frame, set to an I-frame prior to the first frame.

Classifying the first frame may include, when the similarity between the feature maps of the first frame and the second frame is greater than a preset value, classifying the first frame as a P-frame, whereas when the similarity between the feature maps is less than or equal to the preset value, classifying the first frame as an I-frame.

Generating the prediction frame and the residual image using the input frame may include, when the input frame corresponds to an I-frame, generating a distorted frame in which the input frame is encoded and decoded.

Generating the reconstructed frame may include transforming and inversely transforming the residual image into a bitstream.

Generating the prediction frame and the residual image using the input frame may be iteratively performed using the reconstructed frame as input.

Generating the prediction frame and the residual image using the input frame may include, when the input frame corresponds to a P-frame, estimating a motion vector with reference to an original I-frame; and generating a motion-compensated frame using the motion vector and a reconstructed I-frame.

Correcting the reconstructed frame may include updating a transform coefficient for the residual image based on the difference value between the extracted features and the bit rate of the residual image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
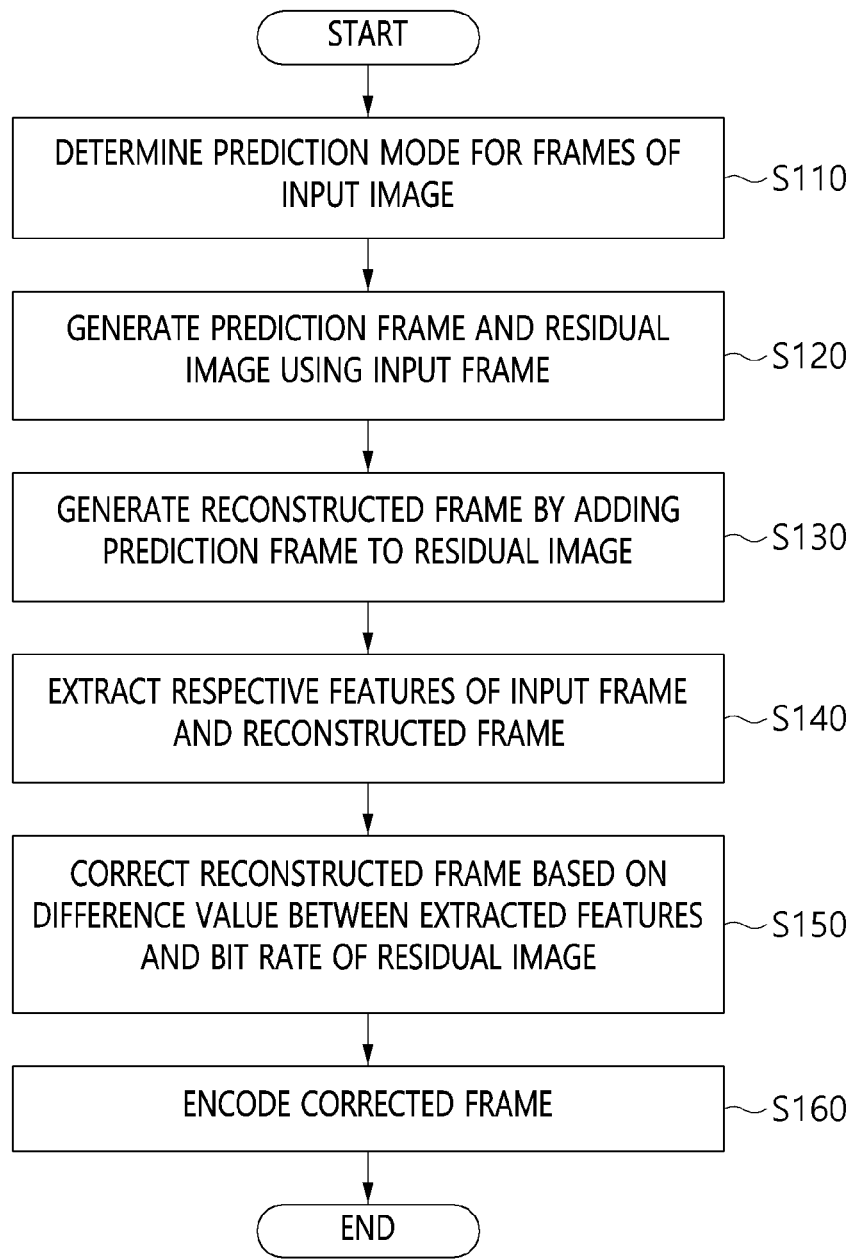
FIG. 1 is a flowchart illustrating an image compression method for machine vision according to an embodiment of the present invention.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a flowchart illustrating an image compression method for machine vision according to an embodiment of the present invention.

The image compression method for machine vision according to the present invention may be performed by an image compression apparatus for machine vision, such as a computing device.

Referring to FIG. 1, the image compression method for machine vision according to the embodiment of the present invention may include determining a prediction mode for frames of an input image at step S110, generating a prediction frame and a residual image using an input frame at step S120, generating a reconstructed frame by adding the prediction frame to the residual image at step S130, extracting respective features of the input frame and the reconstructed frame at step S140, correcting the reconstructed frame based on a difference value between the extracted features and the bit rate of the residual image at step S150, and encoding the corrected frame at step S160.

Here, although not illustrated in FIG. 1, step S110 of determining the prediction mode may include the step of classifying a first frame based on a similarity between feature maps of the first frame and a second frame set to an I-frame prior to the first frame.

Here, at the step of classifying the first frame, when the similarity between the feature map of the first frame and the feature map of the second frame is greater than a preset value, the first frame may be classified as a P-frame, whereas when the similarity between the feature maps is less than or equal to the preset value, the first frame may be classified as an I-frame.

That is, based on a point at which the feature maps are greatly changed due to scene change or the like, an I-frame may be selected.

Here, the method for calculating the similarity between the feature maps may be performed using a method such as cosine similarity calculation or Hamming distance calculation.

Here, at step S120 of generating the prediction frame and the residual image using the input frame, when the input frame corresponds to an I-frame, a distorted frame in which the input frame is encoded and decoded may be generated.

That is, the prediction frame for the I-frame may correspond to the distorted frame.

Here, step S130 of generating the reconstructed frame may include the step of transforming and inversely transforming the residual image into a bitstream.

In this case, step S120 of generating the prediction frame and the residual image using the input frame may be iteratively performed using the reconstructed frame as input.

Here, step S120 of generating the prediction frame and the residual image using the input frame may include the step of, when the current frame corresponds to a P-frame, estimating a motion vector with reference to an original I-frame, and the step of generating a motion-compensated frame using the motion vector and a deformed I-frame.

That is, the prediction frame for the P-frame may be the motion-compensated frame.

Here, step S150 of correcting the reconstructed frame may include the step of updating a transform coefficient for the residual image based on the difference value between the extracted features and the bit rate of the residual image.

Hereinafter, an image encoding method proposed in the present invention will be described with reference to a description of a detailed embodiment. First, it is assumed that an encoding target image is represented by a set of ordered frames $\{I_i|i=0, 1, 2, \ldots\}$, and each frame is mapped to a feature map $\{F_i|i=0, 1, 2, \ldots\}$ by a given feature map extraction module (i.e., a feature extractor).

It is desired that each feature map should contain information sufficient to perform a target machine vision task and minimal information should be extracted by the feature map extraction module.

Figure 2:
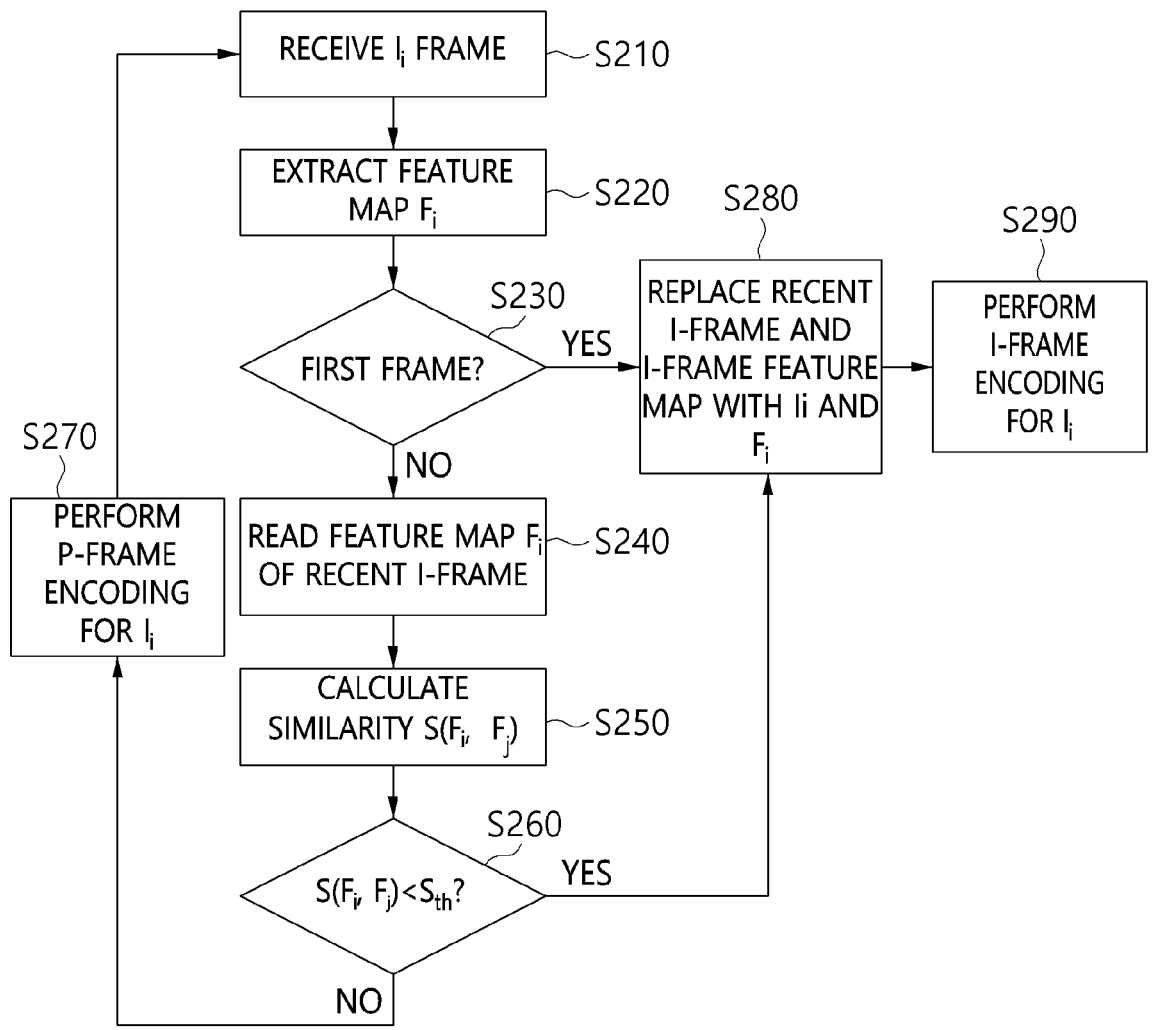
FIG. 2 is a flowchart illustrating a method for selecting an I-frame and a P-frame according to an embodiment of the present invention.

FIG. 2 is a flowchart illustrating a method for classifying an I-frame and a P-frame according to an embodiment of the present invention.

Referring to FIG. 2, it can be seen that a method for selecting an I-frame based on a point at which a feature map is greatly changed due to scene change or the like is used, instead of a method of selecting I-frames at regular intervals.

In detail, when an encoding target frame is received at step S210, an encoder extracts a feature map of the target frame $I_i$ and determines whether the target frame is a first frame at steps S220 and S230. When it is determined at step S230 that the target frame $I_i$ is the first frame, the encoder stores the index of the target frame at step S280, and performs an encoding routine for the I-frame at step S290.

When it is determined at step S230 that the encoding target frame $I_i$ is not a first frame, the feature map of a frame, which is most recently selected as an I-frame, is compared with the feature map $F_i$ of a new frame at steps S240 to S260.

In this case, the similarity between feature maps may be calculated as a cosine similarity, a Hamming distance or the like depending on the types of feature maps, and this calculation process may include a suitable normalization procedure if necessary.

When the similarity between the feature maps is greater than a specific threshold value $S_{th}$ at step S260, a P-frame encoding routine for the encoding target frame $I_i$ is performed at step S270. On the other hand, when the similarity between the feature maps is not greater than the specific threshold $S_{th}$ at step S260, the recent I-frame and the I-frame feature map are replaced with $I_i$ and $F_i$ at step S280, after which the I-frame encoding routine for the encoding target frame $I_i$ is performed at step S290. When encoding of L is terminated, a subsequent frame is input and the same process is performed on the subsequent frame. This process is iterated until a frame that can be read is not present any further.

Figure 3:
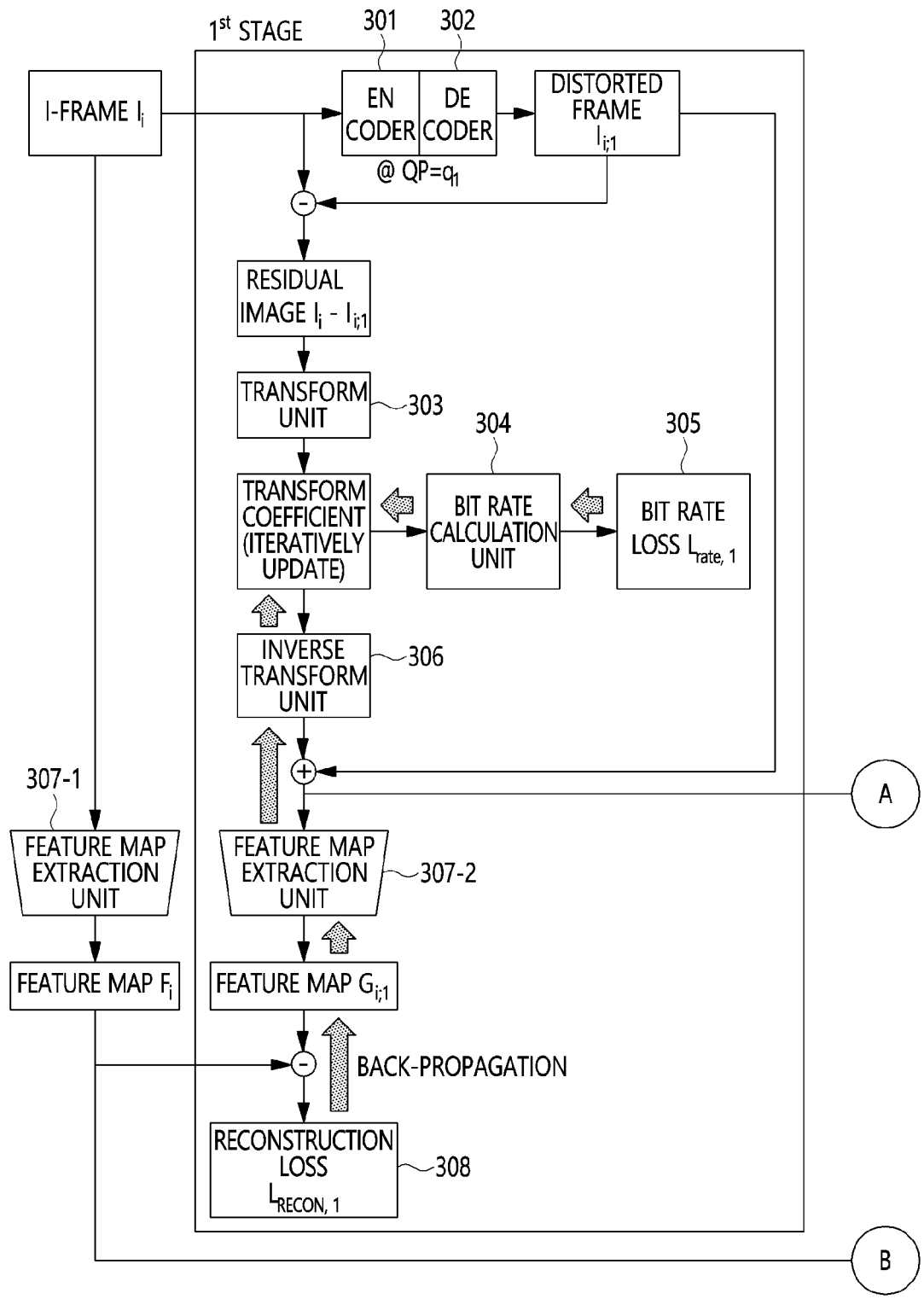
FIGS. 3 and 4 are diagrams illustrating an I-frame encoding routine according to an embodiment of the present invention.
Figure 4:
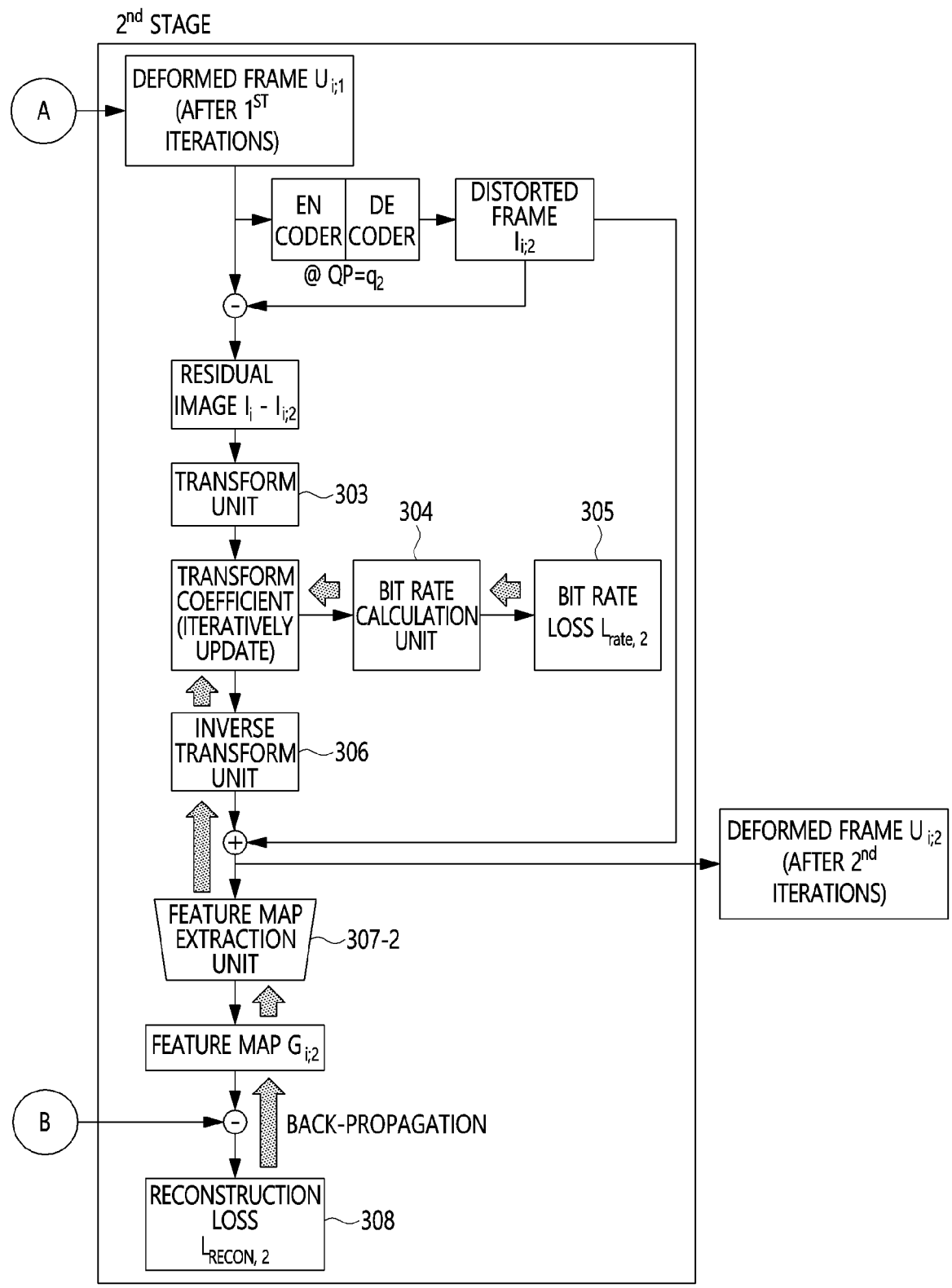

FIGS. 3 and 4 are diagrams illustrating an I-frame encoding routine according to an embodiment of the present invention.

Referring to FIGS. 3 and 4, the I-frame encoding routine is composed of gradual frame deformation stages.

When a frame $I_i$ enters a first deformation stage, a distorted frame is obtained while going through encoding and decoding 301 and 302 using an existing image codec, and then a residual frame from an original frame is obtained. The existing codec uses a transform block structure for an MPEG video codec, and assumes a form in which the distortion level of a decoded image is controllable through setting of a parameter QP.

Transform coefficients TC for the residual image may be calculated with reference to the structure of the transform block used in the existing codec at 303. These coefficients are repeatedly updated depending on the scheme, which will be described later. First, the transform coefficients are input to an artificial neural network 304 for estimating the bit rate when entropy encoding is performed, and thus bit rate loss $L_{rate}$ 305 for inducing bit rate reduction is calculated. The transform coefficients are simultaneously inversely transformed at 306 to reconstruct a residual image, the residual image is added to the distorted frame, and thereafter the added image is input to a feature extraction module (i.e., a feature extractor) 307-2, and a reconstructed feature $G_i$ is obtained. When the difference between $G_i$ and $F_i$, which is previously obtained (e.g., L2-norm), is obtained, reconstruction loss $L_{recon}$ 308 is obtained. Then, the gradient $\nabla_{TC}L_{tot}$ of the loss function for the transform coefficients may be calculated by starting back-propagation from a total loss function $L_{tot}=L_{recon}+\lambda L_{rate}$ (where $\lambda$ is a weight), and the transform coefficients may be updated by the following Equation (1) based on the gradient $\nabla_{TC}L_{tot}$.

$$TC'=TC-\eta\nabla_{TC}L_{tot} \quad (1)$$

Here, $\eta$ denotes a learning rate parameter. The update of the transform coefficients and the calculation of the gradient vector may be iterated a preset number of times, or may be performed until the loss function decreases to the specific threshold value or less. As the iteration progresses, an image input to the feature extraction module is gradually deformed from and then becomes similar to the distorted frame within a range in which $L_{recon}$ is not greatly increased.

As illustrated in FIG. 4, a frame deformed in a first stage is used as the input of a next stage, and the frame is deformed in the next stage in a manner completely identical to that of the first stage, except that the parameter QP of the existing codec is different from that of the first stage. The frame deformation stage may be iterated a number of times ranging from a minimum of one to a random number, wherein the number of stages and QP values in respective stages must be selected depending on the quality degradation speed of a desired distorted frame. By means of iterative frame deformation, an image may be easily compressed using the existing encoder and an image similar to that of the existing scheme may be obtained as feature map output.

Figure 5:
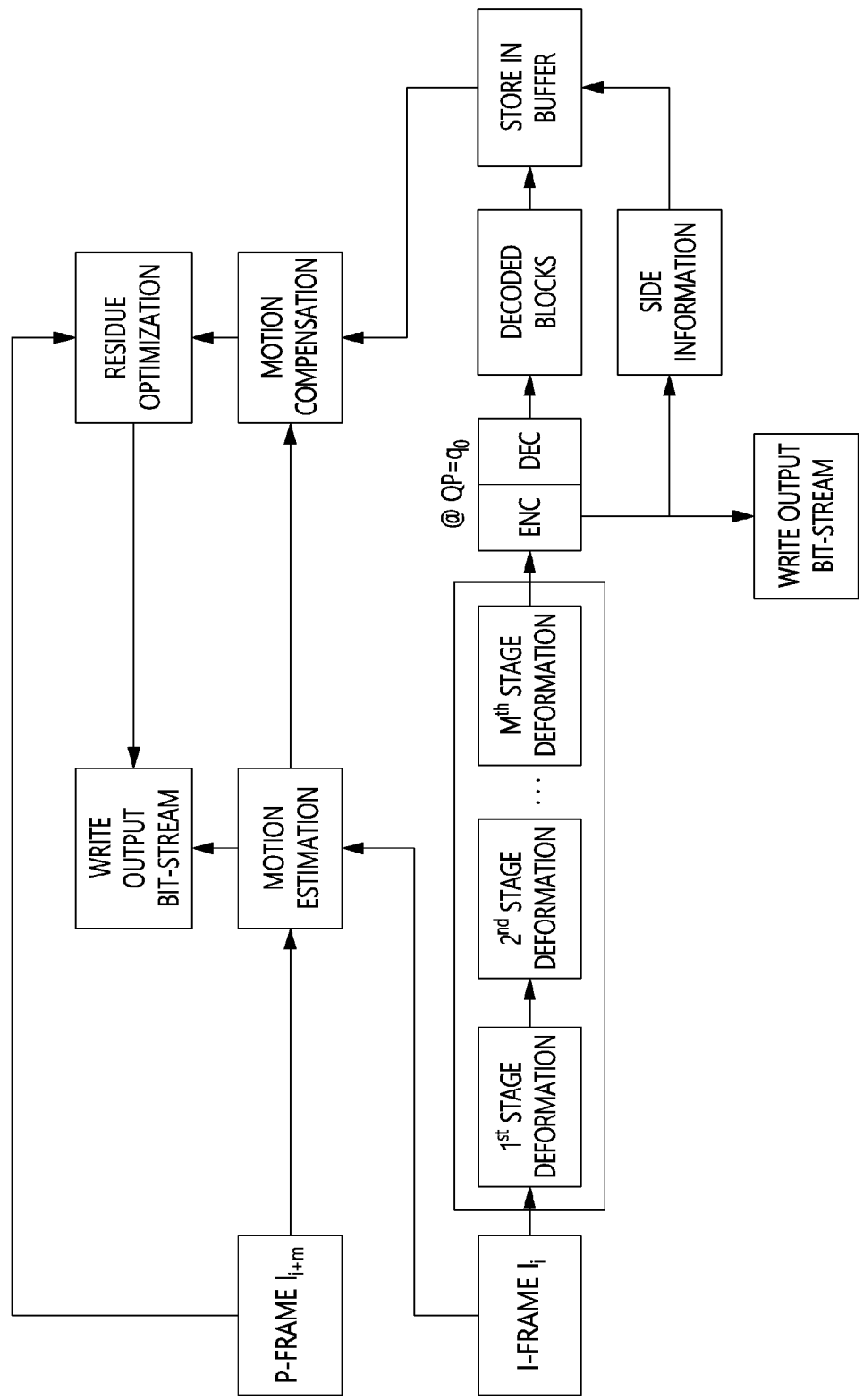
FIG. 5 is a diagram conceptually illustrating a process of encoding an I-frame and a P-frame according to an embodiment of the present invention.

FIG. 5 is a diagram conceptually illustrating a process of encoding an I-frame and a P-frame according to an embodiment of the present invention.

Referring to FIG. 5, after iterative deformation is applied to $I_i$, a deformed frame is finally input to an existing encoder and is recorded in an output bitstream. Therefore, an I-frame may be reconstructed through an existing decoder. Meanwhile, encoding side information and a frame reconstructed by the existing decoder are stored in a buffer and are used to encode a P-frame, which will be subsequently input.

When a frame $I_{i+m}$, which is input after the I-frame $I_i$, enters a P-frame encoding routine, estimation of a motion vector is performed with reference to the original frame. Motion information is recorded in the output bitstream, and is also used to generate a motion-compensated frame. The motion-compensated frame is generated using motion vector information and the deformed I-frame stored in the buffer. When an image having less reconstruction loss is searched for in an area near the image, a frame for which a difference in feature map from the original P-frame is not large may be obtained while inter-prediction is effectively operated.

Figure 6:
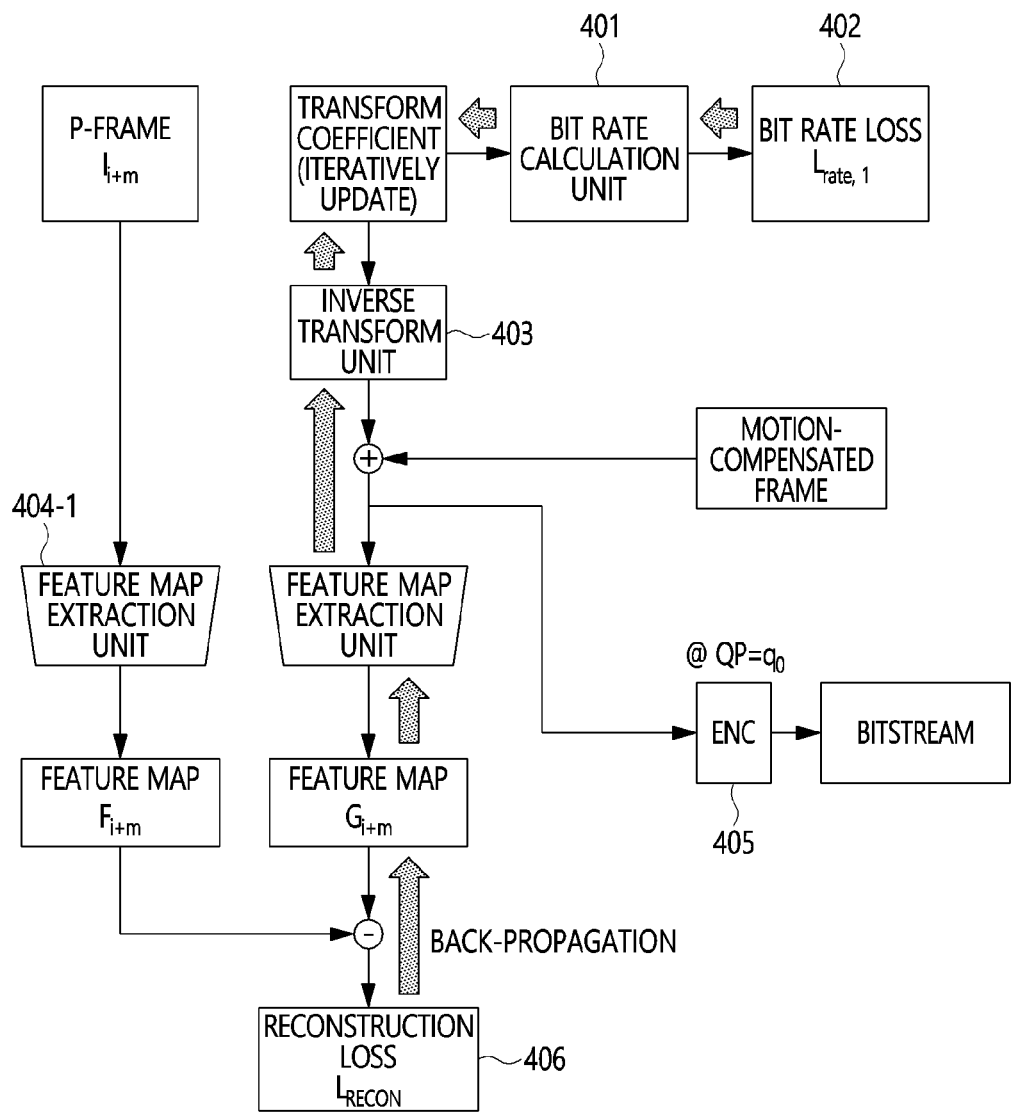
FIG. 6 is a diagram illustrating in detail the residue optimization block of FIG. 5.

FIG. 6 is a diagram illustrating in detail the residue optimization block of FIG. 5.

Referring to FIG. 6, the residue optimization block for searching for an image having less feature map reconstruction loss using a motion-compensated frame as a starting point is illustrated. The residue optimization block is similar to the above-described I-frame deformation stage in that reconstruction loss referring to a feature map obtained from the original frame is used, bit rate loss is calculated from a transform coefficient set, and the transform coefficients are learned based on a total loss function, but it is different from the above-described I-frame deformation stage in that an image to which a residual image is added is a motion-compensated frame rather than a distorted frame. When the optimization of the transform coefficients is completed, an image input to a feature extraction module (feature extractor) is applied to the existing encoder and then recorded in an output bitstream.

Here, the deformed P-frame may be encoded using the inter-prediction mode of the existing encoder, and a decoded I-frame used at this time is the above-described deformed I-frame. Because the existing encoder has been used to encode a P-frame, decoding may also be performed using an existing decoder.

Figure 7:
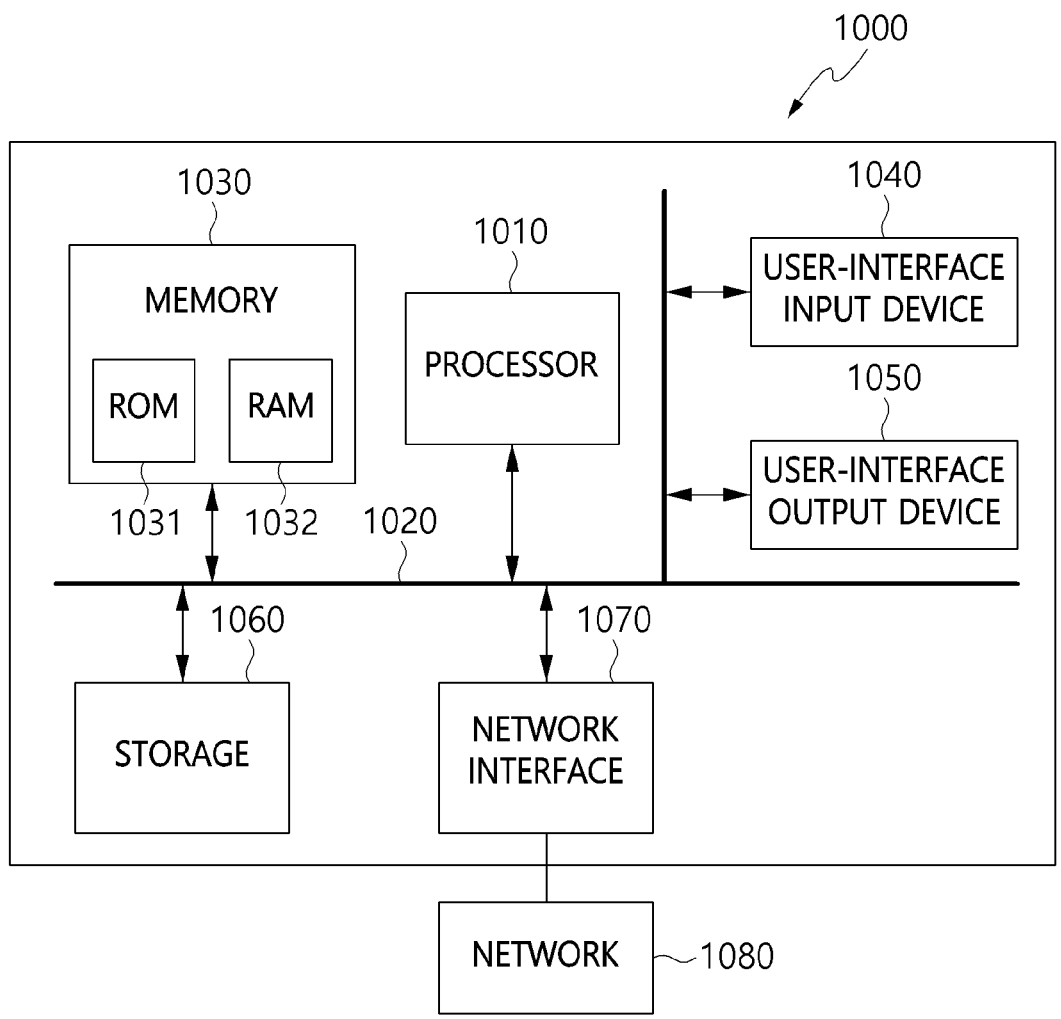
FIG. 7 is a diagram illustrating the configuration of a computer system according to an embodiment.

FIG. 7 is a diagram illustrating the configuration of a computer system according to an embodiment.

An image compression apparatus for machine vision according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

The image compression apparatus for machine vision according to an embodiment of the present invention may include memory 1030 configured to store at least one program and a processor 1010 configured to execute the program, wherein the program includes instructions for performing the steps of determining a prediction mode for frames of an input image, generating a prediction frame and a residual image using an input frame, generating a reconstructed frame by adding the prediction frame to the residual image, extracting respective features of the input frame and the reconstructed frame, correcting the reconstructed frame based on a difference value between the extracted features and a bit rate of the residual image, and encoding the corrected frame.

Here, the step of determining the prediction mode may include the steps of classifying the first frame based on a similarity between feature maps of the first frame and a second frame, set to an I-frame prior to the first frame.

Here, the step of classifying the first frame may include the steps of, when the similarity between the feature maps of the first frame and the second frame is greater than a preset value, classifying the first frame as a P-frame, whereas when the similarity between the feature maps is less than or equal to the preset value, classifying the first frame as an I-frame.

Here, the step of generating the prediction frame and the residual image using the input frame may include the step of, when the input frame corresponds to an I-frame, generating a distorted frame in which the input frame is encoded and decoded.

That is, the prediction frame for the I-frame may correspond to the distorted frame.

Here, the step of generating the reconstructed frame may include the steps of transforming and inversely transforming the residual image into a bitstream.

Here, the step of generating the prediction frame and the residual image using the input frame is iteratively performed using the reconstructed frame as input.

Here, the step of generating the prediction frame and the residual image using the input frame may include the steps of, when the input frame corresponds to a P-frame, estimating a motion vector with reference to an original I-frame, and generating a motion-compensated frame using the motion vector and a reconstructed I-frame.

That is, the prediction frame for the P-frame may correspond to the motion-compensated frame.

Here, the step of correcting the reconstructed frame may include the step of updating a transform coefficient for the residual image based on the difference value between the extracted features and the bit rate of the residual image.

Specific executions described in the present invention are embodiments, and the scope of the present invention is not limited to specific methods. For simplicity of the specification, descriptions of conventional electronic components, control systems, software, and other functional aspects of the systems may be omitted. As examples of connections of lines or connecting elements between the components illustrated in the drawings, functional connections and/or circuit connections are exemplified, and in actual devices, those connections may be replaced with other connections, or may be represented by additional functional connections, physical connections or circuit connections. Furthermore, unless definitely defined using the term "essential", "significantly" or the like, the corresponding component may not be an essential component required in order to apply the present invention.

In accordance with the present invention, an image that can be maximally compressed through a given image encoder may be found among images from which the same feature map is extracted.

Further, the present invention may provide a structure that induces consecutive frames to be deformed in a similar manner.

Therefore, the spirit of the present invention should not be limitedly defined by the above-described embodiments, and it is appreciated that all ranges of the accompanying claims and equivalents thereof belong to the scope of the spirit of the present invention.

What is claimed is:

1. An image compression method for machine vision, comprising:
   determining a prediction mode for frames of an input image;
   generating a prediction frame and a residual image using an input frame;
   generating a reconstructed frame by adding the prediction frame to the residual image;
   extracting respective features of the input frame and the reconstructed frame;
   correcting the reconstructed frame based on a difference value between the extracted features and a bit rate of the residual image; and
   encoding the corrected frame.

2. The image compression method of claim 1, wherein determining the prediction mode comprises:
   classifying the first frame based on a similarity between feature maps of the first frame and a second frame, set to an I-frame prior to the first frame.

3. The image compression method of claim 2, wherein classifying the first frame comprises:
   when the similarity between the feature maps of the first frame and the second frame is greater than a preset value, classifying the first frame as a P-frame, whereas when the similarity between the feature maps is less than or equal to the preset value, classifying the first frame as an I-frame.

4. The image compression method of claim 1, wherein generating the prediction frame and the residual image using the input frame comprises:
   when the input frame corresponds to an I-frame, generating a distorted frame in which the input frame is encoded and decoded.

5. The image compression method of claim 1, wherein generating the reconstructed frame comprises:
   transforming and inversely transforming the residual image into a bitstream.

6. The image compression method of claim 5, wherein generating the prediction frame and the residual image using the input frame is iteratively performed using the reconstructed frame as input.

7. The image compression method of claim 1, wherein generating the prediction frame and the residual image using the input frame comprises:
   when the input frame corresponds to a P-frame,
   estimating a motion vector with reference to an original I-frame; and
   generating a motion-compensated frame using the motion vector and a reconstructed I-frame.

8. The image compression method of claim 4, wherein correcting the reconstructed frame comprises:
   updating a transform coefficient for the residual image based on the difference value between the extracted features and the bit rate of the residual image.

9. An image compression apparatus for machine vision, comprising:
   a memory configured to store at least one program; and
   a processor configured to execute the program,
   wherein the program comprises instructions for performing:
   determining a prediction mode for frames of an input image;
   generating a prediction frame and a residual image using an input frame;
   generating a reconstructed frame by adding the prediction frame to the residual image;
   extracting respective features of the input frame and the reconstructed frame;
   correcting the reconstructed frame based on a difference value between the extracted features and a bit rate of the residual image; and
   encoding the corrected frame.

10. The image compression apparatus of claim 9, wherein determining the prediction mode comprises:
    classifying the first frame based on a similarity between feature maps of the first frame and a second frame, set to an I-frame prior to the first frame.

11. The image compression apparatus of claim 10, wherein classifying the first frame comprises:
    when the similarity between the feature maps of the first frame and the second frame is greater than a preset value, classifying the first frame as a P-frame, whereas when the similarity between the feature maps is less than or equal to the preset value, classifying the first frame as an I-frame.

12. The image compression apparatus of claim 9, wherein generating the prediction frame and the residual image using the input frame comprises:
    when the input frame corresponds to an I-frame, generating a distorted frame in which the input frame is encoded and decoded.

13. The image compression apparatus of claim 9, wherein generating the reconstructed frame comprises:
    transforming and inversely transforming the residual image into a bitstream.

14. The image compression apparatus of claim 13, wherein generating the prediction frame and the residual image using the input frame is iteratively performed using the reconstructed frame as input.

15. The image compression apparatus of claim 9, wherein generating the prediction frame and the residual image using the input frame comprises:
    when the input frame corresponds to a P-frame,
    estimating a motion vector with reference to an original I-frame; and
    generating a motion-compensated frame using the motion vector and a reconstructed I-frame.

16. The image compression apparatus of claim 12, wherein correcting the reconstructed frame comprises:
    updating a transform coefficient for the residual image based on the difference value between the extracted features and the bit rate of the residual image.

* * * * *